Sept. 20, 1966    R. S. PATCH    3,273,585
FLUSHING APPARATUS FOR DISPENSING FREEZERS
Filed March 18, 1963    2 Sheets-Sheet 2
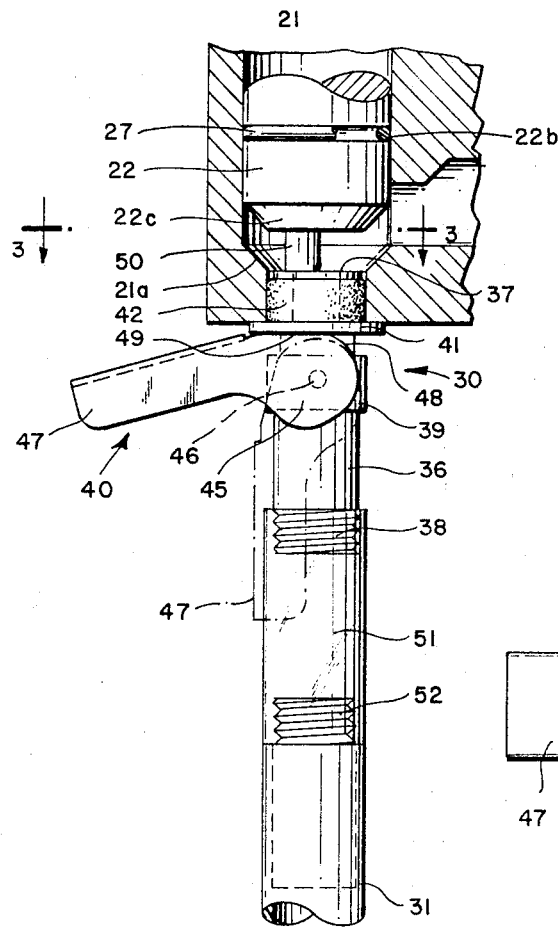
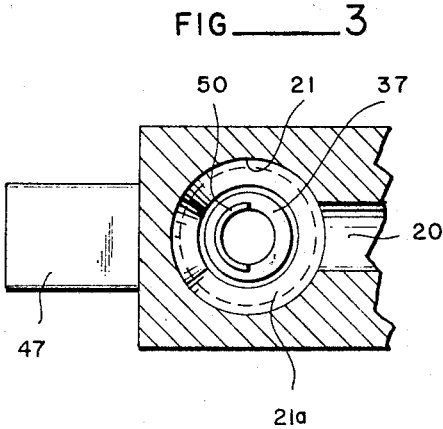
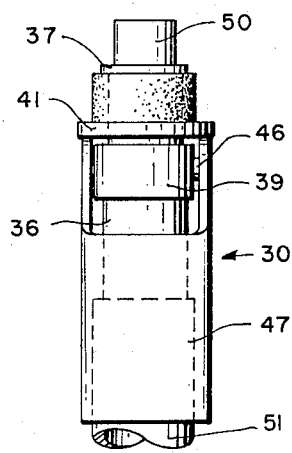
ROBERT S. PATCH
INVENTOR.
BY *Seed & Berry*
ATTORNEYS United States Patent Office
3,273,585
Patented Sept. 20, 1966

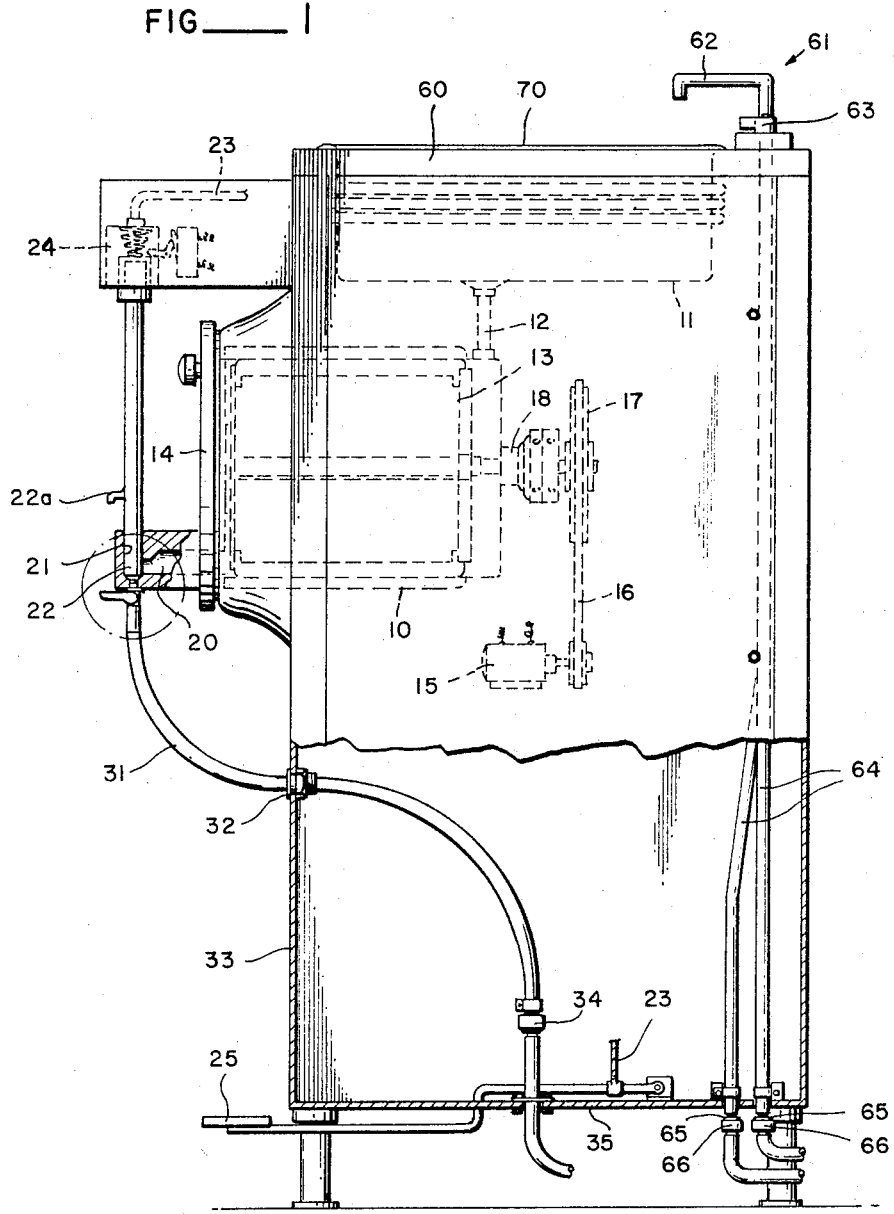

3,273,585
FLUSHING APPARATUS FOR DISPENSING FREEZERS
Robert S. Patch, Bainbridge Island, Wash., assignor to Sweden Freezer Manufacturing Co., a corporation of Washington
Filed Mar. 18, 1963, Ser. No. 265,939
4 Claims. (Cl. 137—240)

This invention relates to flushing apparatus for use in the cleaning of the mix storage tank and freezing cylinder of a dispensing freezer for ice cream, frozen custard and other frozen confections.

In machines of this general nature, the freezing cylinder receives a suitable mix from a storage tank for the mix and discharges such mix as frozen product through a front discharge gate which is controlled by an operator. For sanitary reasons, it is necessary to flush and clean the mix tank and freezing cylinder periodically. The cleaning is accomplished by first using a cleaning solution and then a fresh water rinse. In the past this has been accomplished by pouring the cleaning solution from a container into the mix tank and then catching this solution in a second container placed beneath the discharge gate. Thus the cleaning operation was a batch process requiring two containers and close and constant attention by the operator.

The present invention has as its principal object the provision of improved flushing and cleaning apparatus which eliminates the need for pouring container and makes it possible for the operator to flush and clean the mix tank and freezing cylinder more efficiently and more effectively.

These and other objects will become readily apparent from the more extensive description of the invention.

In accomplishing the above mentioned and other objects and advantages of the invention, as pointed out in the specification to follow, I have provided the improved details of construction, the preferred forms of which are illustrated in the accompanying drawings, wherein:

FIG. 1 is a side elevational view of a dispensing freezer with parts thereof broken away for purposes of better illustration.

FIG. 2 is an enlarged detail, partially in section, of circled portion in FIG. 1.

FIG. 3 is a horizontal cross-sectional view taken on line 3—3 of FIG. 2.

FIG. 4 is an enlarged detail of the stopper assembly and handle actuated cam elements.

Referring to the accompanying drawings, the freezing cylinder 10 and mix storage tank 11 are interconnected by a feed pipe 12, through which the flow is controlled by a suitable valve such as shown in United States Patent No. 2,924,951, issued February 16, 1960.

The freezing cylinder includes a conventional dasher 13 which is journaled at one end in a removable cover plate 14 at the front of the cylinder. I employ an electric motor 15 to rotate the dasher and these elements are interconnected through a belt 16 and pulley 17 to the dasher's drive shaft 18. The shaft projects outwardly from the rear end of the cylinder as illustrated in broken lines in FIG. 1.

The cover plate 14 includes an outwardly projecting spout formed adjacent the lower external edge thereof. This spout has a horizontal passage 20 formed therein which extends outwardly from the back face of the cover plate 14 and intersects a vertical bore 21 the lower end of which serves as a discharge opening for frozen product from the freezing cylinder. Discharge of the frozen product from the cylinder through the passage 20 and bore 21 is controlled by a vertically movable valve 22 which operates in the bore 21 and projects thereabove. The valve may be raised by a handle 22a or by actuation of a flexible spring-returned cable 23 interconnected with the upper end of the valve by a suitable adapter 24 and operated from a treadle 25. Such a foot operated mechanism is disclosed in pending U.S. patent application, Ser. No. 164,791, filed January 8, 1962, now Patent No. 3,127,061.

The bore 21 is inwardly tapered beneath its intersecting with the passage 20 to provide an annular seat 21a and the lower end of the valve 22 is shaped in complementing fashion as indicated at 22c. A seal between the valve and the upper part of the bore 21 is provided by an O-ring 27 retained in an annular groove 22b. Thus it can readily be seen that in the normal operation of the machine, the frozen product is discharged from the freezing cylinder when the valve 22 is raised such that its lower end clears the seat 21a.

The present invention as applied to this general type of machine will now be described in detail. It includes stopper assembly 30 which is adapted to be removably secured within the lower end of the bore 21. This assembly is in turn connected to a flexible drain hose 31 which extends into the freezer cabinet through a fitting 32 mounted in the front wall 33 thereof. At its lower end the drain hose connects to a fitting 34 near the bottom wall 35 of the cabinet to which a waste line may be connected.

The stopper assembly 30 comprises a rigid tube 36 having an annular flange 37 formed at its upper end and having its lower end threaded at 38. Intermediate its ends the tube 36 has an integral collar 39 on which a cam lever 40 is pivotably mounted. A rigid washer 41 and a compressible rubber stopper 42 are movably positioned on the tube between the cam lever 40 and the flange 37 whereby the activation of the cam lever will raise the washer 41 so as to compress the sleeve 42 between the washer and flange and thereby cause a radial expansion or bulging of the stopper.

The lever 40 is generally U-shaped to straddle the collar 39. It includes a pair of spaced cam plates 45 pinned as at 46 to opposite sides of the tube and joined by a handle portion 47. The camming edges 48 of each plate 45 are rounded and merge into a flat lock edge 49 which serves to engage the stopper 41 when the handle 43 is pivoted to a position at substantially right angle to the tube so as to compress and radially expand the stopper into sealing and securing engagement in the bore 21. This action is illustrated in FIG. 2, wherein is shown in broken lines the lever 40 in its unengaged position with the handle 47 lying adjacent the tube 36, and in full lines the sealing position wherein the handle is pulled out and the stopper pressed by the washer into expanded position to grip the walls of the bore 21.

A valve-fitting finger projection 50 is provided at the extreme upper end of the tube 36 so that when the stopper assembly is introduced into the lower end of the bore 21, the lifting projection will engage the valve 22 and elevate it to an open position as illustrated in FIG. 2. The threaded lower end of the tube 36 receives one end of a transparent sight glass 51 which in turn is threaded at its other end onto a nipple 52. This nipple is press-fitted into the upper end of the hose 31.

The cabinet of the dispensing freezer has a drainboard top or cover plate 60 surrounding the rim of the mix storage tank 11, and at the rear of the cover plate there is mounted a faucet assembly 61 having a swing spout 62 and hot and cold water valves 63 at opposite sides thereof. Feed hoses 64—64 for the valves pass down the back of the cabinet to suitable hose fittings 65—65 which are secured to the base of the cabinet and are adapted to receive hose connections 66—66 from the water supply in the establishment in which the machine is to be operated. During operation of the dispensing freezer a lid 70 rests on the cover plate to close the tank 11.

When the stopper assembly 30 is not in use it rests against the sleeve fitting 32 with the excess of the hose 31 stored within the cabinet. When it is desired to furnish the dispensing freezer, the operator pulls on the stopper assembly 30 to draw hose through fitting 32 so that the stopper can be plugged into the lower end of the discharge bore 21 and be locked in sealing position by pulling the cam lever handle 40 outwardly. After removing the lid 70 from the mix tank and the related feed valve (not shown) from the feed tube 12 the operator need only turn on the water and regulate the valves 63 to obtain the desired flushing water temperature. Detergent solution can be added as desired. During the final rinse, the operator ca observe the sight glass 51 to determine when the rinse water has become clear. The stopper assembly can then be easily disengaged by pulling down the handle 47 and returned to storage position by pushing the exposed portion of the base through the fitting 32 into the cabinet.

Thus the present invention provides a novel and useful improvement in means for flushing and cleaning the mix storage tank and freezing cylinder of a dispensing freezer. It eliminates the bothersome time consuming and often messy procedure heretofore required. My stopper assembly comprises a simple relatively inexpensive mechanism which permits easy and quick attachment or release and simultaneously opens the valve and holds the valve open so long as the assembly is attached for its intended use.

It is thought that the invention will have been clearly understood from the foregoing detailed description. Changes in the details of construction will suggest themselves and may be resorted to without departing from the spirit of the invention, wherefore it is my intention that no limitations be implied and that the hereto annexed claims to given a scope fully commensurate with the broadest interpretation to which the employed language admits.

I claim:
1. In combination, a dispensing freezer having a freezing chamber with a discharge opening, a lift valve for selectively closing said opening, a drain tube, and hollow stopper means on said tube detachably fitting into said discharge opening and having a lift finger adapted to engage said valve and lifting it from closing position without blocking the drain tube whereby cleaning fluid in said chamber can be drained therefrom to a point remote from said discharge opening.

2. In combination, a dispensing freezer having a cabinet and a freezing chamber with a discharge opening mounted in said cabinet, a flexible drain tube slidably threaded through an opening in the wall of said cabinet and anchored at its lower end for drain discharge beneath the cabinet, said tubing being of sufficient length to reach from its said anchored end to said disharge opening, and hollow stopper means on the upper end of said tube adapted to detachably interfit with said discharge opening whereby cleaning fluid in said chamber can be drained therefrom to a point remote from said discharge opening, said drain tube being adapted to be stored within said cabinet with said stopper means exposed outside of said wall opening in position to be manually gripped for withdrawing sufficient of the drain tube from the cabinet to position said stopper means in the discharge opening.

3. The combination according to claim 2 in which said drain tube has a sight section adjacent said stopper means.

4. The combination according to claim 2 in which said discharge opening has a lift valve and said stopper has a finger adapted to engage said valve and lift it from closing position without blocking the upper end of the drain tube.

References Cited by the Examiner
UNITED STATES PATENTS

| | | | |
|---|---|---|---|
| 2,152,429 | 3/1939 | Cave | 285—8 |
| 2,422,060 | 6/1947 | Wotring | 285—8 |
| 2,593,454 | 4/1952 | Hyser | 285—8 |
| 2,624,308 | 1/1953 | Wittlin | 285—93 X |
| 2,924,951 | 2/1960 | Swenson | 62—304 |

WILLIAM F. O'DEA, *Primary Examiner.*
CLARENCE R. GORDON, *Examiner.*